Figure 1:
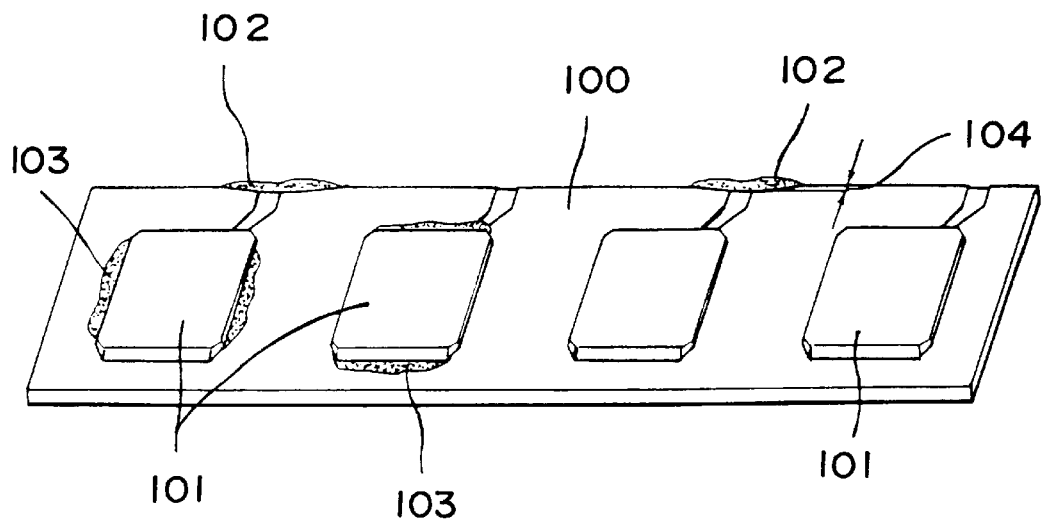
Figure 2:
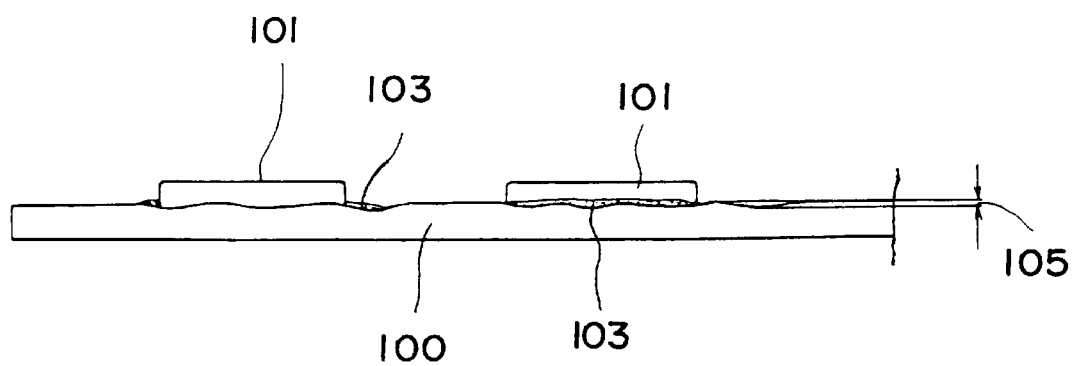
Figure 3:
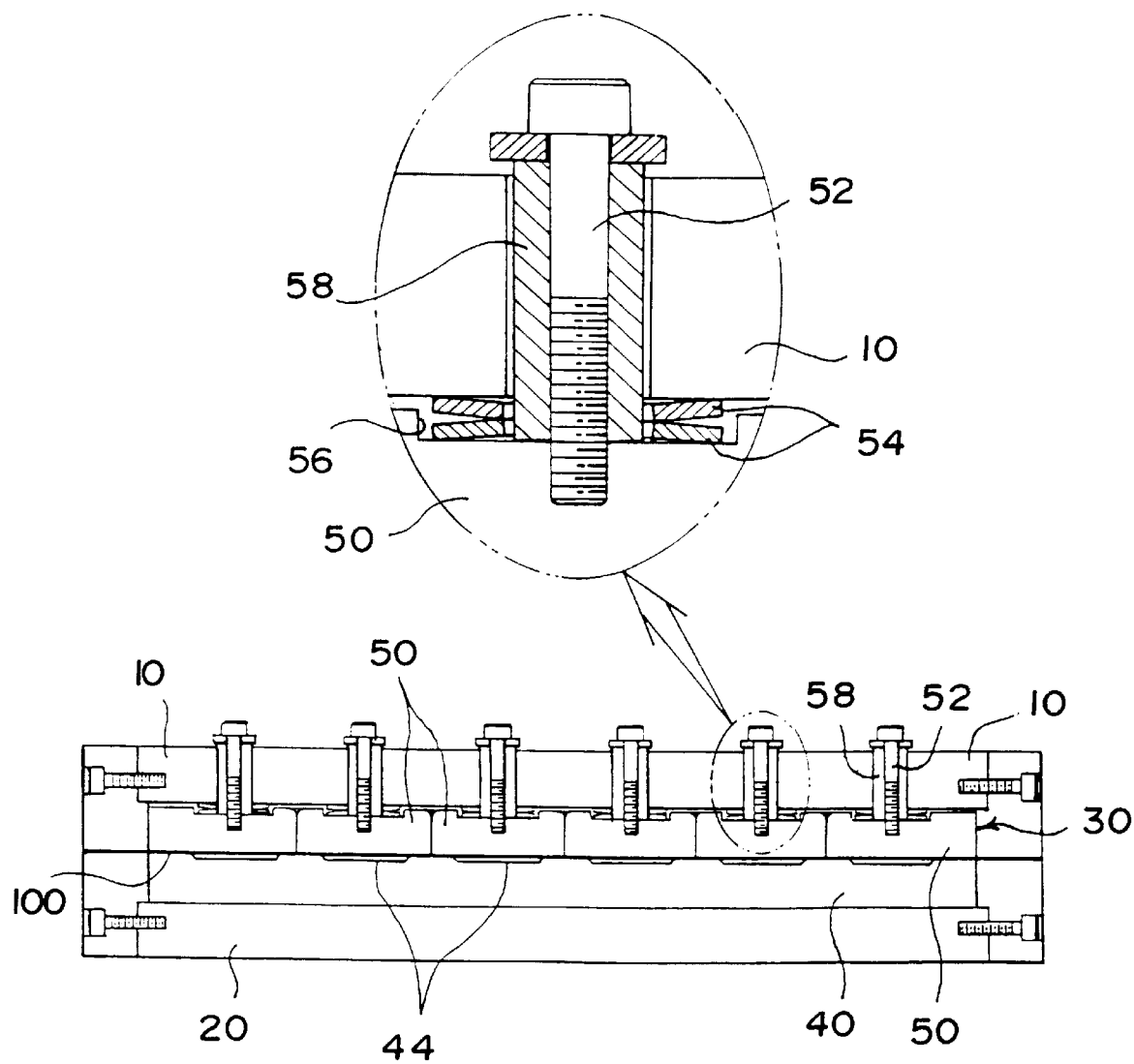

United States Patent [19]
Han

[11] Patent Number: 5,914,136
[45] Date of Patent: Jun. 22, 1999

[54] APPARATUS FOR FORMING SEMICONDUCTOR CHIP PACKAGES

[75] Inventor: Hyo Yong Han, Pupyong-Ku, Rep. of Korea

[73] Assignee: Trimecs Co. Ltd., Inchon, Rep. of Korea

[21] Appl. No.: 08/988,821

[22] Filed: Dec. 11, 1997

[30] Foreign Application Priority Data

Jun. 27, 1997 [KR]  Rep. of Korea ..................... 97-28255

[51] Int. Cl.⁶ ........................... B29C 45/14; B29C 45/32
[52] U.S. Cl. .......................... 425/117; 425/190; 425/588
[58] Field of Search .................................. 425/116, 117, 425/183, 188, 192 R, 190, 544, 572, 588, 408, DIG. 228

[56] References Cited

U.S. PATENT DOCUMENTS

| | | | |
|---|---|---|---|
| 5,061,164 | 10/1991 | Sabado et al. | 425/544 |
| 5,252,051 | 10/1993 | Miyamoto et al. | 425/116 |
| 5,281,121 | 1/1994 | Tsutsumi et al. | 425/544 |
| 5,282,733 | 2/1994 | Noritake et al. | 425/192 R |
| 5,366,364 | 11/1994 | Tanaka et al. | 425/544 |
| 5,405,255 | 4/1995 | Neu | 425/116 |
| 5,454,705 | 10/1995 | Back | 425/116 |
| 5,507,633 | 4/1996 | Osada et al. | 425/116 |
| 5,650,177 | 7/1997 | Kojima et al. | 425/546 |
| 5,750,154 | 5/1998 | Maeda et al. | 264/272.17 |

*Primary Examiner*—Robert Davis
*Attorney, Agent, or Firm*—Bacon & Thomas, PLLC

[57] ABSTRACT

The present invention relates to an apparatus for forming semiconductor chip packages which is able to compensate for the flatness of substrates and the true straightness of edges of substrates, which substrates are inserted in molds in a forming process of semiconductor chip packages. According to the present invention, the semiconductor package strips excellent in surface flatness and side straightness of a substrate can be manufactured, because the thickness deviation and the side nonuniformity of a substrate can be compensated for in the resin molding process of the semiconductor package by use of a forming apparatus which comprises the individual cavity blocks, elastically mounted so as to float up and down, and the elastic pressing members, mounted on one end of the upper and lower chases. Therefore, the flashes owing to the defective substrates as encountered in a conventional art can be prevented, whereby mass production of semiconductor chips with the high precision and the excellent quality can be realized.

1 Claim, 4 Drawing Sheets

APPARATUS FOR FORMING SEMICONDUCTOR CHIP PACKAGES

FIELD OF THE INVENTION

The present invention relates to an apparatus for forming semiconductor chip packages, and more particularly an apparatus for forming semiconductor chip packages with a new construction, which is able to compensate for the flatness of substrates and the true straightness of edges of substrates, which substrates are inserted in molds in a forming process of semiconductor chip packages.

BACKGROUND OF THE INVENTION

Generally, semiconductor chip packages are manufactured by attaching semiconductor chips on a lead frame of copper and then electrically connecting the semiconductor chips with wire. The semiconductor chip packages may be divided into the quad flat package (QFP), the pin grid array (PGA) and the ball grid array (BGA) according to manufacturing methods and characteristics of semiconductor chip packages. Particularly, the BGA packages which are direct mounting type packages without a lead frame so as to allows high integration, will be under growing demand in consideration of the technical characteristic of the semiconductor industry which is in a trend of getting preciser.

The BGA packages use a substrate which is formed by laminating a multitude of thin resin sheets to a predetermined thickness through adhesive and cutting the resultant lamination to have a proper width by using an end mill. However, as the substrate mentioned above was formed of multi-layered resin sheets, it was difficult to obtain a uniform thickness. Besides, there was a disadvantage that the cutting face was not accurately straight.

The nonuniform thickness of a substrate and the poor straightness of a cutting face as mentioned above cause a flash due to the molding resin which leaked out through uneven crevices between an upper and lower form-imparting molds and a substrate at the time of molding semiconductor chip packages. FIGS. 1 and 2 show a flash 103 due to a thickness error 105 of a substrate 100 at the time of molding semiconductor chip packages and a flash 102 due to a straightness error 104 resulted from the cutting of a substrate 100.

The flashes in the molding process of semiconductor chips as explained above constitutes a serious cause for production of defective products in the later cutting and packing stages in the course of producing semiconductor chip packages. Therefore, in an effort to reduce those thickness errors in substrate plates, there were employed, for example, such methods in which the corresponding parts of molds were replaced every time of molding or respective substrates were classified based on the thickness groups in order to compensate for the thickness difference among molds. However, these methods still resulted in thickness difference of 1–3 mils for each unit package, even when compensation was made by a cavity bar for each unit substrate, whereby the generation of flashes on individual semiconductor chips could not be avoided and delay in replacement entailed a big loss in productivity.

SUMMARY OF THE INVENTION

The present invention which was created to resolve the above-described problems of conventional art has the object to provide an apparatus for forming semiconductor chip packages with a new design, which is excellent in evenness and straightness due to compensation for the error in substrate thickness and the error in straightness of the substrate sides cut or trimmed in a forming process of semiconductor packages, and is capable of preventing flash occurrence on substrates.

According to a characteristic of the present invention, there is provided an apparatus for forming semiconductor chip packages comprising upper and lower cavity blocks 30, 40 engaged together, with a plurality of substrates 100 interposed, and upper and lower chases 10, 20 disposed around said upper and lower cavity blocks 30, 40 and supporting them respectively, one of said upper and lower cavity blocks 30, 40 being formed with a plurality of cavities 44, characterized in that said apparatus comprises a plurality of individual cavity blocks 50 juxtaposed corresponding to individual substrates 100, said plurality of individual cavity blocks being manufactured discretely and positioned on the side not having cavities 44, retainer members 52 engaged with said individual cavity blocks 50 through vertical penetration of corresponding chases 10 for allowing vertical floating of said individual cavity blocks 50 relative to the corresponding chases 10, and elastic members 54 disposed between said individual cavity blocks 50 and the corresponding chases 10.

According to another characteristic of the present invention, there is provided an apparatus for forming semiconductor chip packages comprising upper and lower cavity blocks 30, 40 engaged together with a plurality of substrates 100 interposed, and upper and lower chases 10, 20 disposed around and supporting said upper and lower cavity blocks 30, 40 respectively, wherein said apparatus comprises a first elastic pressing member 60 rotatably hinged by a first pin onto a side of one of the upper and lower chases 10, 20 and formed with an inclined portion 62 on its inside tip, and a second elastic member 70 coupled by a second pin onto a mating side of the other chase 20 to be pressed inwardly through contact with said inclined portion 62 of said first elastic pressing member 60 and provided on its inside surface with a flat portion 76 for contacting an edge of one of the substrate 100.

BRIEF DESCRIPTION OF THE DRAWINGS

FIGS. 1 and 2 are respectively a perspective view and a side elevation of a conventional substrate, particularly showing the flashes, FIGS. 3 and 4 are respectively a front section and a side section of an apparatus for forming semiconductor chip packages according to an embodiment of the present invention, and FIG. 5 shows an enlarged view of a major part of the present invention, as shown in FIG. 4.

DETAILED DESCRIPTION OF THE INVENTION

Now a preferred embodiment of the present invention will be described with reference to the accompanying drawings.

FIGS. 3 and 4 are a front section and an side section of a forming apparatus according to the present invention respectively and FIG. 5 shows an enlarged view of a major part thereof. As illustrated, the same as in an ordinary conventional apparatus for forming semiconductor packages is the construction that the upper and lower cavity blocks 30, 40 as well as a runner block 42 are joined together, surrounded by the upper and lower chases 10, 20, and cavities 44 are formed on the top surface of the lower cavity block 40.

However, the present invention has a characteristic feature that the upper cavity block 30 is composed of the individual cavity blocks 50 which are individually manufactured and juxtaposed corresponding to individual substrates 100. And the individual cavity blocks 50 are constructed in such a manner that they can float up and down in relation to the upper chases 10.

Specifically, each of the upper individual cavity blocks 50 is mounted in the upper chase 10 so as to be cleared 59 from it by a retainer member 52 of bolt type which pentrate vertically through the upper chaser 10 via a sleeve 58. And on the top part of the upper individual cavity block 50 where the retainer member 52 is fastened, there is formed a recess 56 in which an elastic member 54 like a disk spring is interposed.

According to such a construction, because the height is controlled through an elastic vertical motion of the upper individual cavity block 50 even if there exists the thickness deviation in the individual substrates 100 which are interposed between the upper and lower cavity blocks 30, 40, the thickness deviation in the substrates can be compensated for within the molds, if the elastic modulus of the disk spring as an elastic member 54 is properly set to within the allowance of the substrate at the time of designing molds.

Although there was described in the above embodiment a case wherein an upper cavity block 30 is made of the upper individual cavity blocks 30 corresponding to respective substrates, a lower cavity block 50 may be composed of individual cavity blocks. In that case, a substrate 100 should be placed upside down between the upper and lower cavity blocks so that the resin molding may be positioned correctly.

Figure 4:
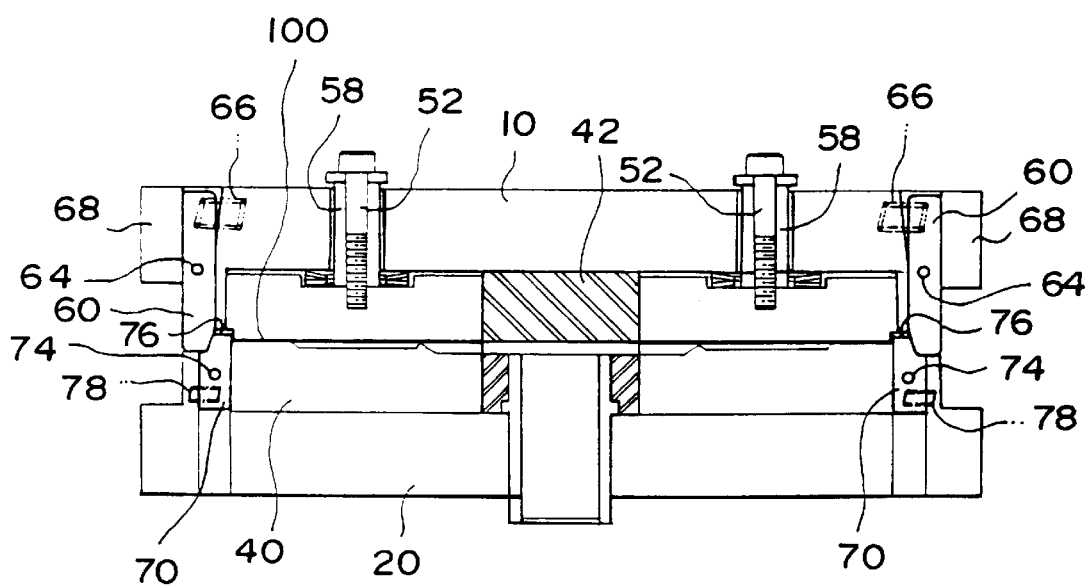
Figure 5:
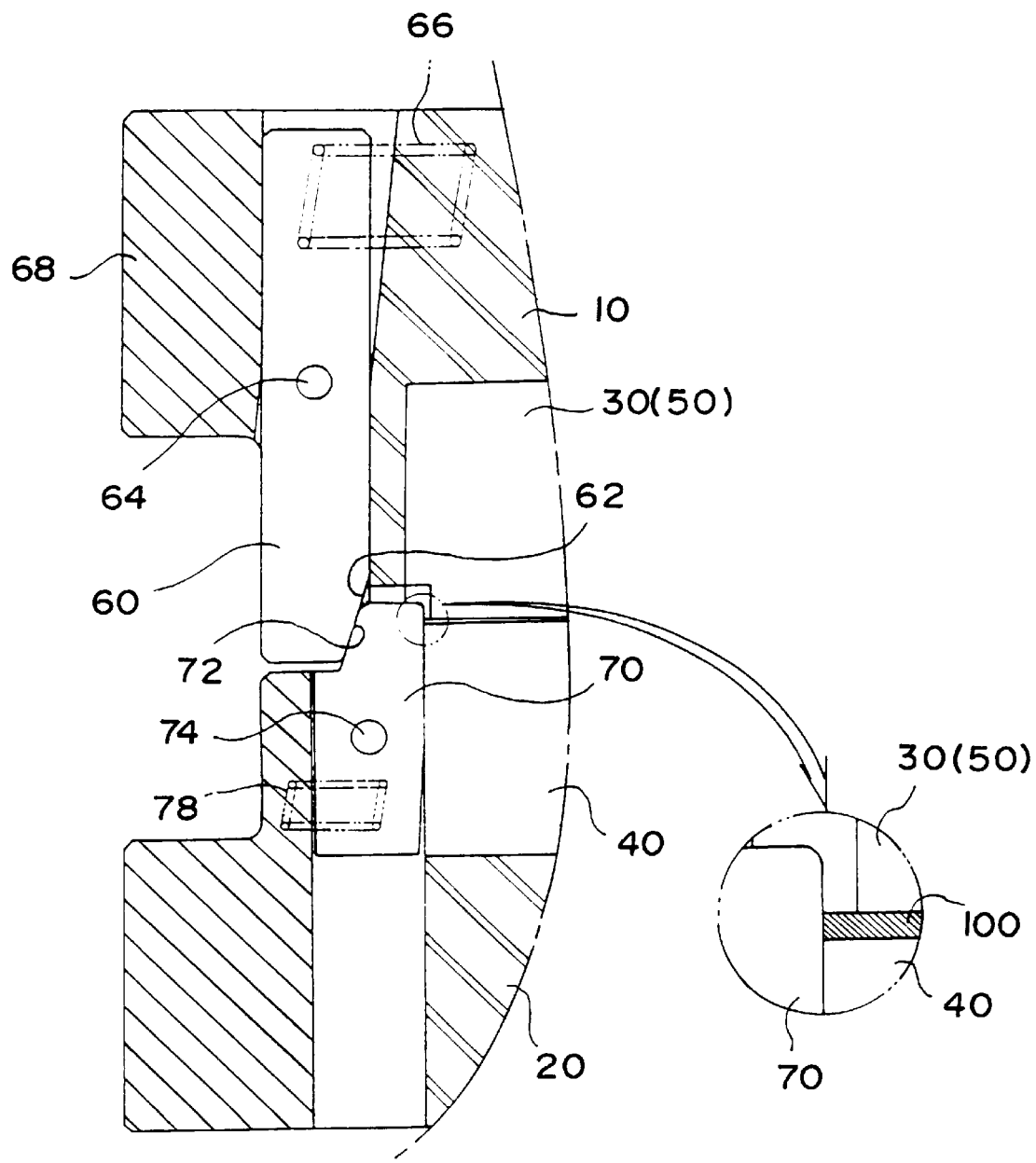

Another characteristic feature of the present invention will be explained by referring to FIGS. 4 and 5. The first elastic pressing member 60, which is formed with a inclined portion 62 on its inward lower side, is rotatably mounted on one end of the upper chase 10 by a first fixing pin 64. This first elastic pressing member 60 is turned away and returned back in an elastic manner by a spring 66, which is disposed on one end part as seen in the drawings. The turning of the elastic pressing member 60 is regulated by a stopper 68 which may constitute a part of the upper chase 10 or a discrete member.

On a mating side of the lower chase 20 corresponding to the above-mentioned first elastic pressing member 60, there is mounted the second elastic pressing member 70 rotatably about a second fixing pin 74, which member is formed with an inclined portion 72 on its outward upper side to be in contact with the inclined portion 62 of the above mentioned first elastic pressing member 60. On the lower one side of this second elastic pressing member 70, there is also disposed a spring 78, so that the second elastic pressing member 70 may be elastically turned or returned back. The inner surface of this second elastic pressing member 70 comprises a flat portion 76 to contact the end side of a substrate 100 which is positioned between the upper and lower cavity blocks 30, 40. Accordingly, at the instant when the upper and lower molds are engaged, the first elastic pressing member 60 which is normally urged inward comes into contact with the second elastic pressing member 70 to press the latter inward, whereby the second pressing member 70 presses the end side of the substrate 100 with its inner flat surface 76. At this time, because the substrate 100 of resinous material is in a pliable state due to the preheating at around 175° C., the substrate 100 is pressed by the flat portion 76 on its end side so that the end side is smoothly trimmed to provide the substrate 100 with an excellent straightness.

As a matter of course, a reverse arrangement in which the first elastic pressing member 60 is pin-coupled onto the lower chase 20 and the second elastic pressing member 70 is pin-coupled to the upper chase 10 could serve the same function of the present invention.

According to the present invention as explained above, semiconductor package strips which is excellent in surface flatness and side straightness of a substrate can be manufactured, because the thickness deviation and the side nonuniformity of a substrate 100 can be compensated for in the resin molding process of the semiconductor packages by use of a forming apparatus which comprises the individual cavity blocks 50 elastically mounted so as to float up and down, and the elastic pressing members 60, 70 mounted on one end of the upper and lower chases 10, 20. Therefore, the flashes owing to the defective substrates as encountered in a conventional art can be prevented, whereby mass production of semiconductor chips with the high precision and the excellent quality can be realized.

What is claimed is:

1. An apparatus for forming semiconductor chip packages, comprising:

upper and lower cavity blocks (30, 40) engaged together with a plurality of substrates (100) interposed;

upper and lower chases (10, 20) disposed around and supporting said upper and lower cavity blocks (30, 40), respectively;

a first elastic pressing member (60) rotatably hinged by a first pin onto a side of one of said upper and lower chases (10, 20), said first elastic pressing member (60) being formed with an inclined portion (62) on an inside tip thereof; and a second elastic pressing member (70) coupled by a second pin onto a mating side of the other of said upper and lower chases (20, 10) to be pressed inwardly through contact with said inclined portion (62) of said first elastic pressing member (60), said second elastic pressing member (70) being provided with a flat portion (76) on a inside surface thereof for contacting an end side of one of said substrates (100).

* * * * *